United States Patent [19]
Doehmel

[11] Patent Number: 4,843,997
[45] Date of Patent: Jul. 4, 1989

[54] SHIP PROVIDED WITH AIR DEFLECTOR
[75] Inventor: Kurt Doehmel, Seevetal-Maschen, Fed. Rep. of Germany
[73] Assignee: Shell Oil Company, Houston, Tex.
[21] Appl. No.: 774,856
[22] Filed: Sep. 10, 1985

Related U.S. Application Data
[63] Continuation of Ser. No. 592,656, Mar. 23, 1984.

[30] Foreign Application Priority Data
Apr. 29, 1983 [GB] United Kingdom ............... 8311776

[51] Int. Cl.⁴ ............................................. B63B 17/00
[52] U.S. Cl. ................... 114/270; 114/67 R; 114/74 R
[58] Field of Search ............ 114/270, 72, 74 R, 74 X, 114/361, 102, 56, 67 R; 296/1 S; 135/88, 90

[56] References Cited
U.S. PATENT DOCUMENTS

| | | | |
|---|---|---|---|
| 3,447,503 | 6/1969 | Myers | 114/77 R |
| 3,485,197 | 12/1969 | Brett | 114/102 |
| 3,695,673 | 10/1972 | Meadows | 296/1 S |
| 3,947,065 | 3/1976 | Gieger | 296/1 S |
| 4,056,279 | 11/1977 | Dorsch | 296/1 S |
| 4,092,754 | 6/1978 | Yosy . | |
| 4,378,747 | 4/1983 | Beatty et al. | 114/56 |

FOREIGN PATENT DOCUMENTS

| | | | |
|---|---|---|---|
| 2919466 | 4/1980 | Fed. Rep. of Germany | 296/1 S |
| 274771 | 7/1927 | United Kingdom | 135/90 |

Primary Examiner—Sherman D. Basinger

[57] ABSTRACT

Since the superstructure of ships are often very high and bulky they cause a high air resistance to the forward movement of the ship which results in a high fuel consumption of the ship. In order to reduce the air resistance to the forward movement of the ship, a special type of air deflector is arranged in front of the superstructure, which is of such a design that it can be easily fitted and removed at will.

5 Claims, 3 Drawing Sheets

SHIP PROVIDED WITH AIR DEFLECTOR

This is a continuation, of application Ser. No. 592,656, filed Mar. 23, 1984 and now abandoned.

BACKGROUND OF THE INVENTION

The present invention relates to a ship, in paritcular a tanker, having a superstructure extending above the deck of the ship.

Since the superstructures of ships are often very high and bulky they cause a high air resistance to the forward movement of the ship. This means that the presence on the ship of a high and bulky superstructure contributes to the fuel consumption of the ship.

In view of the high fuel prices of the present, it is worthwhile from an economical point of view to try to reduce the air resistance to the forward movement of the ship as much as possible.

SUMMARY OF THE INVENTION

The applicant has found that a substantial reduction of the fuel consumption during normal operation of a ship having a high and bulky superstructure can be obtained by providing the ship with a special type of air deflector, which can easily be fitted when it is needed and which can easily be removed when it is not needed.

Therefore a ship, in particular a tanker, having a superstructure extending above the deck of the ship, includes according to the invention, an air deflector arranged in front of the superstructure so as to reduce the air resistance to the forward movement of the ship, wherein the air deflector is in the form of a screen so arranged that it is inclined to the horizintal plane, that it is removable at will and that it extends from the deck or from a level close to the deck towards the superstructure and to a level at a substantial distance above the deck.

In an attractive embodiment of the invention the screen is made of sheet material.

In order to be able to fit and remove the screen quickly and easily a screen made of flexible sheet material, for example, made of cloth is preferred.

It is particularly attractive to support the screen by a guide cable and/or a guide rail.

Preferably such a guide cable and/or guide rail is so arranged that it is inclined to the horizontal plane, that it extends from the deck or from a level close to the deck towards the superstructure and to a level at a substantial distance above the deck.

DESCRIPTION OF THE DRAWINGS

The invention will be further explained with reference to the drawings, wherein.

DESCRIPTION OF PREFERRED EMBODIMENTS

Figure 1:
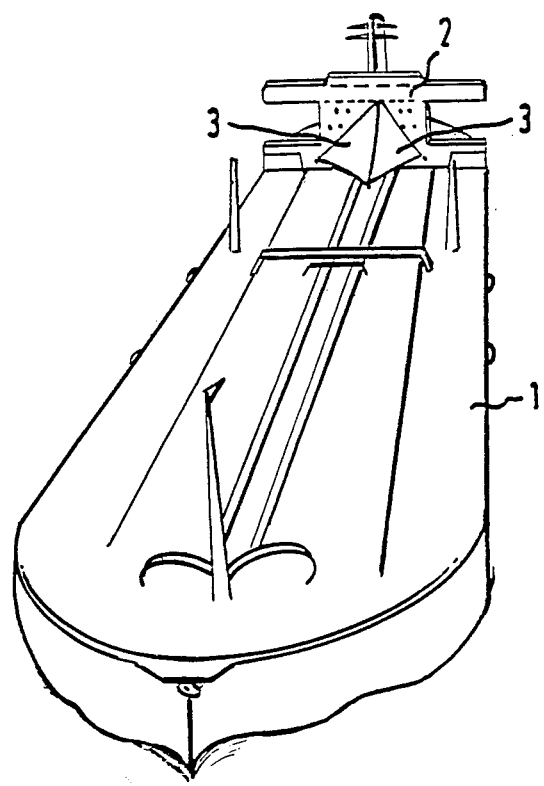
FIG. 1 shows a perspective view of a ship provided with a first embodiment of an air deflector according to the invention.

In FIG. 1, a ship 1 is shown having a superstructure 2 which is so high and bulky that it causes a large air resistance to the forward movement of the ship. By arranging an air deflector 3 according to the invention in front of the superstructure, the air resistance to the forward movement of the ship is substantially reduced.

Figure 8:
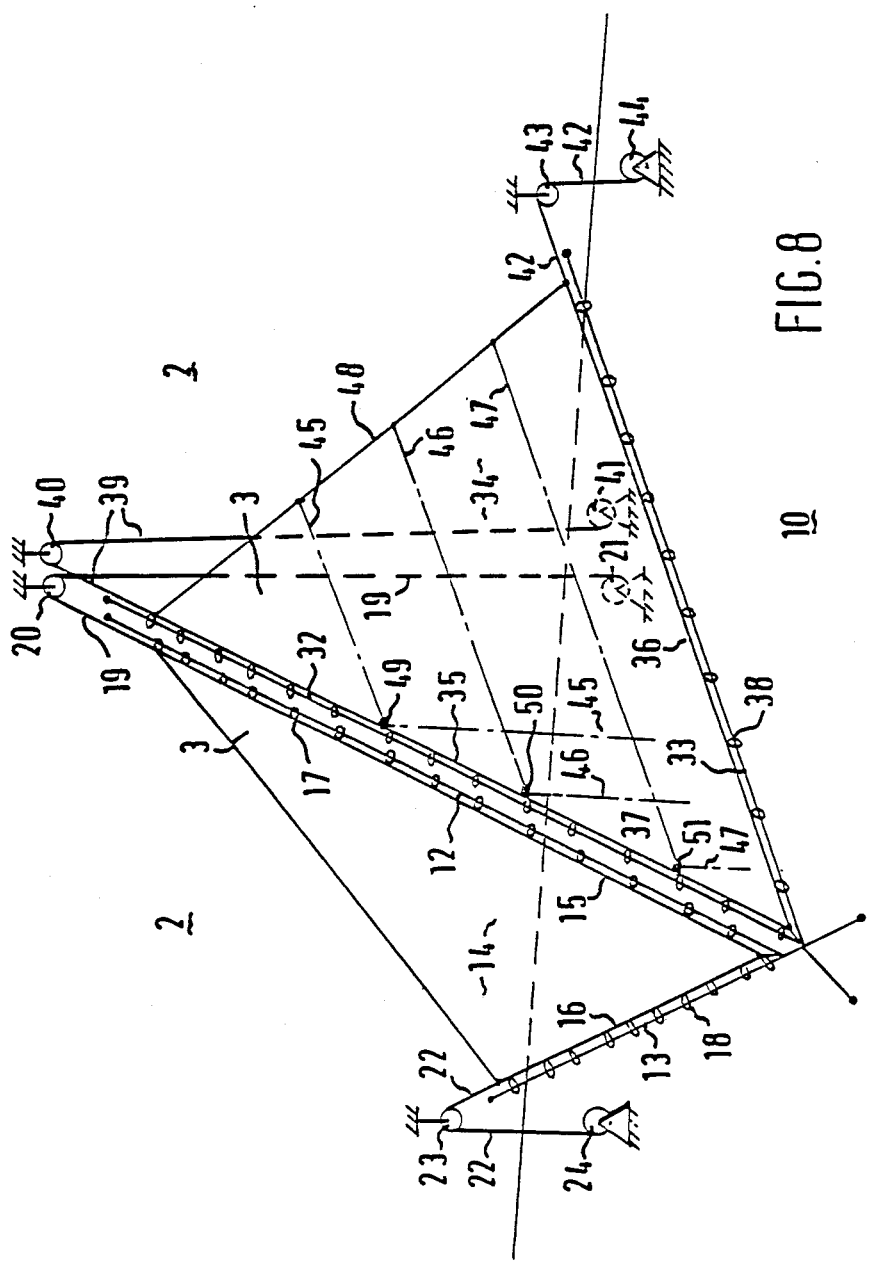
FIG. 8 shows a perspective view of the embodiment of the air deflector according to FIG. 1 on a larger scale.

The air deflector 3 will now be described more in detail with reference to FIG. 8. In FIG. 8 two parallel guide cables 12, respectively 32, extend from the deck 10 towards the superstructure 2. One end of each guide cable 12, respectively 32, is secured to the deck 10 and the other end of each guide cable 12, respectively 32, is secured to the superstructure 2 at a substantial distance above the deck 10 as shown. Furthermore lower guide cables 13, respectively 33, is secured to the deck 10 and the other end of each lower guide cable 13, respectively 33, is secured to a corresponding point, for example on the superstructure 2, a small distance above the deck 10.

The air deflector 3 comprises two triangular sails 14 and 34 each made of a suitable cloth. Each sail 14, respectively 34, has a leading edge 15, respectively 35, and a lower edge 16, respectively 36. The leading edge 15 of the sail 14 is provided with guide rings 17 which fit around the guide cable 12 in such a manner that they can slide along the guide cable 12, whereas the leading edge 35 of the sail 34 is provided with guide rings 37 which fit around the guide cable 32 in such a manner that they can slide along the guide cable 32. The lower edge 16 of the sail 14 is provided with guide rings 18 which fit around the lower guide cable 13 in such a manner that they can slide along the guide cable 13, whereas the lower edge 36 of the sail 34 is provided with guide rings 38 which fit around the lower guide cable 33 in such a manner that they can slide along the lower guide cable 33.

The sail 14 can be hoisted by means of a cable 19 passing through a fixed block 20 and connected to a winch 21, whereas the sail 34 can be hoisted by means of a cable 39 passing through a fixed block 40 and connected to a winch 41.

The sail 14 can be stretched in a lateral direction by means of a cable 22 passing through a fixed block 23 and connected to a winch 24, whereas the sail 34 can be stretched in a lateral direction by means of a cable 42 passing through a fixed block 43 and connected to a winch 44.

Preferably, the sails 14, respectively 34, are provided with a number of extra cables which, during normal use of the sails, are parallel to the lower edge 16, respectively 36 of each sail 14, respectively 34.

In FIG. 8 only the sail 34 is provided with said extra cables, but it should be understood that also the sail 14 is preferably provided with said extra cables.

The extra cables are indicated by the reference numerals 45, 46, 47. One end of each cable 45, 46, 47 is connected to the rear edge 48 of the sail 34. Each cable 45, 46, 47 passes respectively through an eye 49, 50, 51 in the sail 34 located adjacent to the leading edge 35 of the sail 34.

The sail 34 is hoisted by hauling in the cable 39 by means of the winch 41, by hauling in the cable 42 by means of the winch 44 and by paying out the extra cables 45, 46 and 47. The extra cables 45, 46 and 47 may be connected to corresponding winches (not shown) if desired. The sail 14 is hoisted in a similar manner.

After the hoisting of the sails 14 and 34 they will both be in the position as shown in FIG. 8 and together they form an effective air deflector 3.

The sail 34 is lowered by paying out the cable 39 by means of the winch 41, by paying out the cable 42 by means of the winch 44 and by hauling in the extra cables 45, 46 and 47, if desired by means of a winch (not shown). The sail 14 is lowered in a similar manner.

From the above it will be clear that the embodiment of the air deflector 3 according to FIG. 8 can be easily fitted (by hoisting) and can be easily removed (by lowering). This is a great advantage since it is often desirable to clear the deck, for example in port, in order to enable personnel to carry out their duties.

It is possible to use guide rails instead of the guide cables 12, 32, 13 and 33. In that case the guide rings 17, 37, 18 and 38 have to be replaced by suitable runners so designed that they can cooperate with and slide along the guide rails.

In the embodiment according to FIGS. 1 and 8 two triangular sails 14 and 34 are used to form the air deflector 3.

Figure 3:
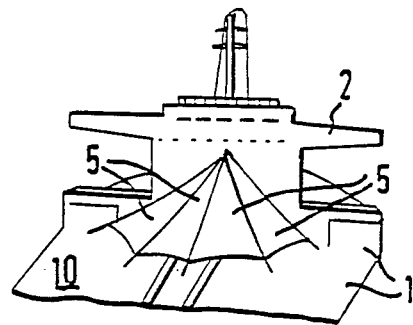
FIG. 3 shows the rear part of the ship of FIG. 1 provided with a third embodiment of the air deflector according to the invention.
Figure 4:
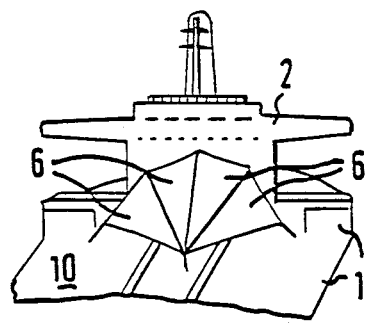
FIG. 4 shows the rear part of the ship of FIG. 1 provided with a fourth embodiment of the air deflector according to the invention.
Figure 7:
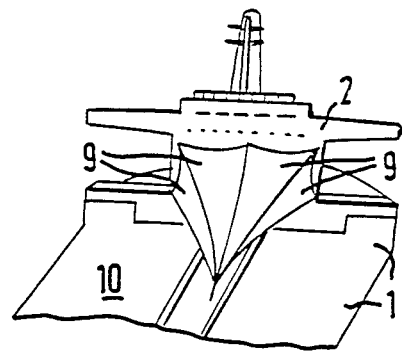
FIG. 7 shows the rear part of the ship of FIG. 1 provided with a seventh embodiment of the air deflector according to the invention.

Instead it is possible to use more than two triangular sails, for example four. The air deflector 5 as shown in FIG. 3 comprises, for example, four triangular sails, wherein the base of each triangular sail is close to the deck 10. The air deflector 6 as shown in FIG. 4 comprises four triangular sails as well, wherein, however, the base of each triangular sail is close to the superstructure 2. The same applies to air deflector 9 as shown in FIG. 7.

Figure 2:
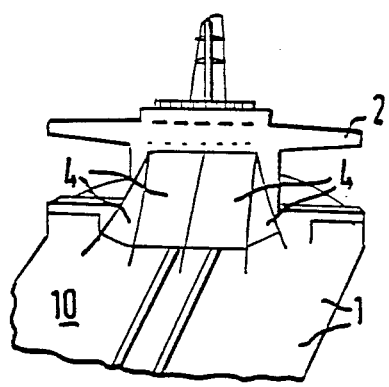
FIG. 2 shows the rear part of the ship of FIG. 1 provided with a second embodiment of the air deflector according to the invention.
Figure 6:
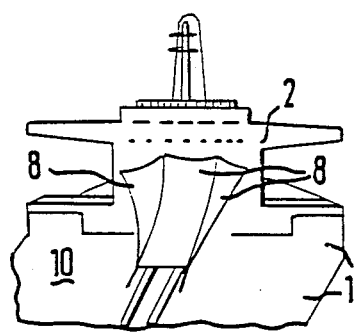
FIG. 6 shows the rear part of the ship of FIG. 1 provided with a sixth embodiment of the air deflector according to the invention.

Combinations of rectangular and triangular sails are possible as well. For example, air deflector 4 as shown in FIG. 2 comprises two rectangular sails in the middle and a triangular sail at each side, whereas the air deflector 8 as shown in FIG. 6 comprises a single rectangular sail in the middle and a triangular sail at each side.

Figure 5:
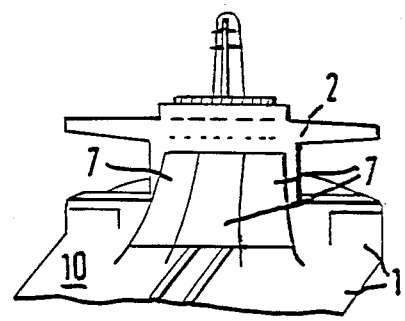
FIG. 5 shows the rear part of the ship of FIG. 1 provided with a fifth embodiment of the air deflector according to the invention.

FIG. 5 shows an air deflector 7 comprising three rectangular sails.

It will b clear that the air deflector can be composed of sails of many different shapes.

The screen forming the deflector can be made of cloth, preferably conventional sail cloth as used on sailing ships, as described in the above. Instead, it is possible, however, to use any other suitable flexible sheet material.

It is even possible to use rigid sheet material in the form of thin plates. These plates are preferably guided along suitable guide rails in order to locate the plates in a desired position so as to form the air deflector. These constructions should, however, be so designed that the plates can be easily put in position and removed, if desired. It is, for example, possible to make the screen of a plurality of long slender plates or lamella interconnected along their edges in a flexible manner, so that a structure is formed similar to a venetian blind, which is guided along guide rails.

The screen according to the invention has the advantage that it reduces the air resistance to the forward movement of the ship. Moreover, it offers protection to the heat of the sun and to rain.

What is claimed is:

1. A method for reducing air resistance to the forward movement of a ship having a superstructure extending above a deck of the ship comprising, providing at least one flexible sail, hoisting the sail in front of the superstructure to form an air deflector, with the sail being so arranged as to be inclined to a horizontal plane and to extend from a level at least close to the deck towards the superstructure and to a level at a substantial distance above the deck.

2. A method for reducing air resistance to the forward movement of a ship having a superstructure extending above a deck of the ship comprising, arranging at least one upwardly extending cable guide or rail so as to be inclined to a horizontal plane and to extend from a level at least close to the deck towards the superstructure and to a level at a substantial distance above the deck, arranging laterally extending cable guides or rails so as to extend from the vicinity of the lowermost ends of the upwardly extending cable guide or rail and towards the lateral extremities of the superstructure, attaching flexible sails to the cable guides or rails, hoisting and stretching the sails by sliding the sails along the cable guides or rails, thereby forming an air deflector in front of the superstructure.

3. The method of claim 2 including attaching the flexible sails to the cable guides or rails with guide rings.

4. The method of claim 3 wherein each flexible sail is hoisted in a vertical direction by a winch and cable which passes through a fixed block at least near the top of the upwardly extending cable guide or rail and then attaches to the sail.

5. The method of claim 3 where each flexible sail is attached in a lateral direction by a winch and cable which passes through a fixed block at one side of the superstructure and then attaches to the sail.

* * * * *